April 26, 1960 W. P. HENDERSON 2,934,307
VALVES
Filed Dec. 11, 1957 3 Sheets-Sheet 1
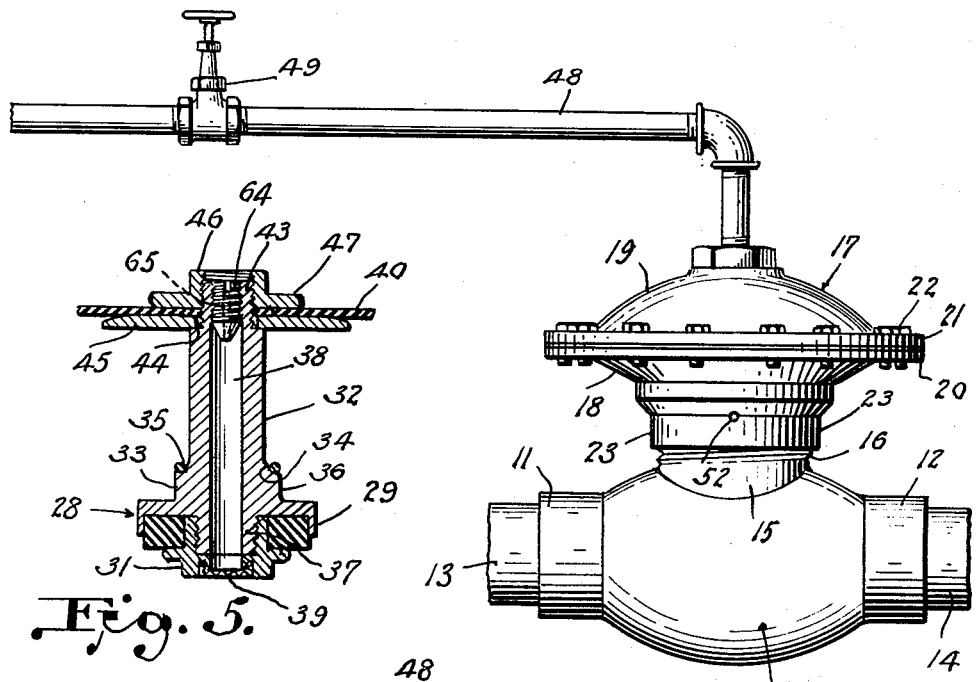
Fig. 1.
Fig. 5.
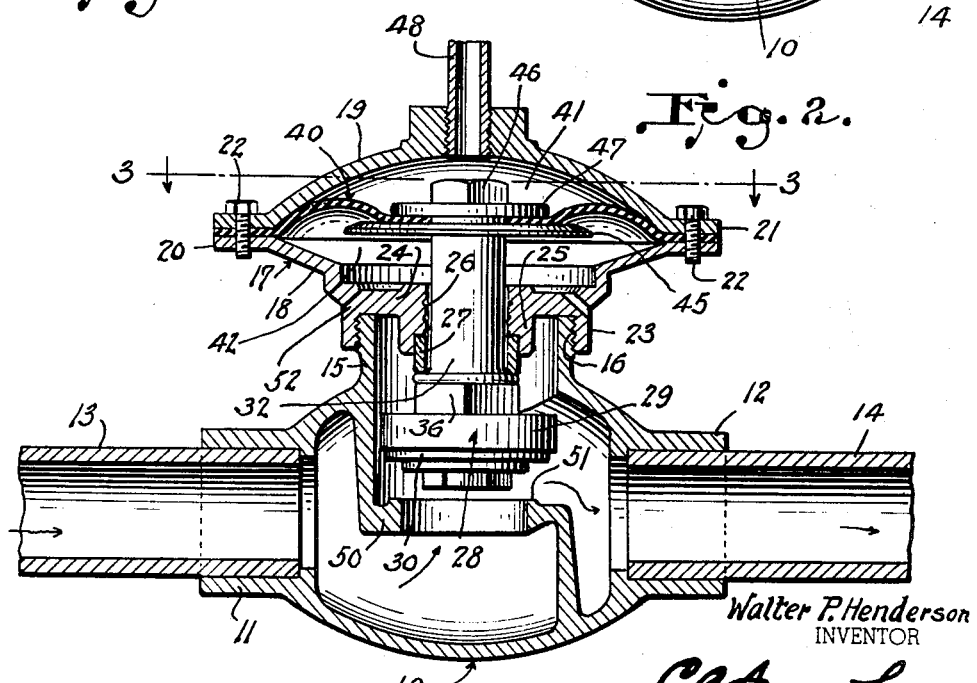
Fig. 2.
Walter P. Henderson
INVENTOR
BY *CA Snow & Co.*
ATTORNEYS.

April 26, 1960 W. P. HENDERSON 2,934,307
VALVES
Filed Dec. 11, 1957 3 Sheets-Sheet 2

Walter P. Henderson
INVENTOR

BY CASnow&Co.
ATTORNEYS.

April 26, 1960 W. P. HENDERSON 2,934,307
VALVES
Filed Dec. 11, 1957 3 Sheets-Sheet 3

INVENTOR
Walter P. Henderson
BY *Hastings Ackley*
ATTORNEY

United States Patent Office 2,934,307
Patented Apr. 26, 1960

2,934,307

VALVES

Walter P. Henderson, Dallas, Tex.

Application December 11, 1957, Serial No. 702,203

12 Claims. (Cl. 251—41)

This invention relates to valves and more particularly a pressure operated valve.

This application is a continuation-in-part of my copending application Serial No. 556,206, filed December 20, 1955, now abandoned.

An object of this invention is to provide an improved combined diaphragm and globe valve interposed in a fluid line with a pilot line connected to the upper chamber in the diaphragm housing for effecting opening and closing of the globe valve.

Another object of this invention is to provide in a diaphragm valve assembly an improved means for lubricating the valve stem and also means for exhausting any foreign particles from the lower diaphragm chamber.

A further object of this invention is to provide in a valve of this type an improved means whereby the fluid passing through the valve will lubricate or moisten the valve stem and enter the lower diaphragm chamber only during the time that the valve plug is in motion from a closed to an open position or from an open to a closed position.

One object of the invention is to provide a new and improved pressure operated valve which is closed by the force of the fluid whose flow is controlled by the valve.

Another object is to provide a valve, of the type described, the operative components thereof being mounted on and in a housing removably mounted on a valve body which is connectable in a fluid flow line whereby the operative components may be removed for inspection or repair without disconnecting the valve body from the fluid flow line.

Still another object is to provide a valve, of the type described, wherein the housing has an upper and a lower chamber separated by a movable diaphragm to which a valve stem is connected which is movable to a valve seat in the valve body by fluid pressure from the pressure side of the fluid flow line admitted to the upper chamber through the valve stem.

A further object is to provide a valve, of the type described, wherein the housing is provided with a control outlet opening to permit escape of fluid from the upper chamber whereby when said control outlet is opened the pressure of the fluid in the line causes the valve stem to be moved to open position.

A still further object is to provide a valve, of the type described, wherein the housing is provided with a vent opening downwardly outwardly from the lower chamber and connecting with the bottom of a debris collecting channel.

Another object is to provide a valve, of the type described, wherein a sealing means is mounted on the valve stem to seal between the valve stem and the housing to prevent flow of fluid thereinbetween from the valve body into the lower chamber.

Still another object is to provide a valve, of the type described, wherein the housing is provided with a vertical bore in which the valve stem is slidable and wherein the valve stem abuts the side wall of the bore and is guided thereby during its movement between upper and lower open positions, the valve stem being provided with circumferentially spaced longitudinal flutings or flats whereby fluid from the valve body is admitted into the lower chamber to expel debris therefrom to the vent.

A further object is to provide a valve having a housing carrying a diaphragm operated valve stem for closing a valve seat of a valve body to which the housing is connected wherein means are provided for admitting fluid from the valve body into the housing to cleanse the housing below the diaphragm by washing out the debris through vents provided in the housing.

Additional objects and advantages of the invention will be readily apparent from the reading of the following description of a device constructed in accordance with the invention, and reference to the accompanying drawings thereof, wherein:

Figure 1 is a detail side elevation of a diaphragm valve constructed according to an embodiment of this invention;

Figure 2 is a vertical section taken longitudinally through the valve structure;

Figure 5 is a fragmentary vertical section through the diaphragm valve stem and valve plug;

Figure 3:
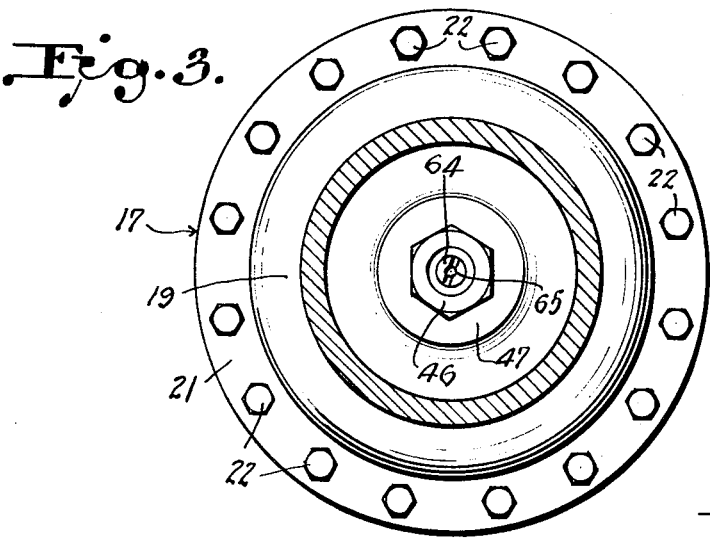
Figure 3 is a sectional view taken on line 3—3 of Figure 2.
Figure 4:
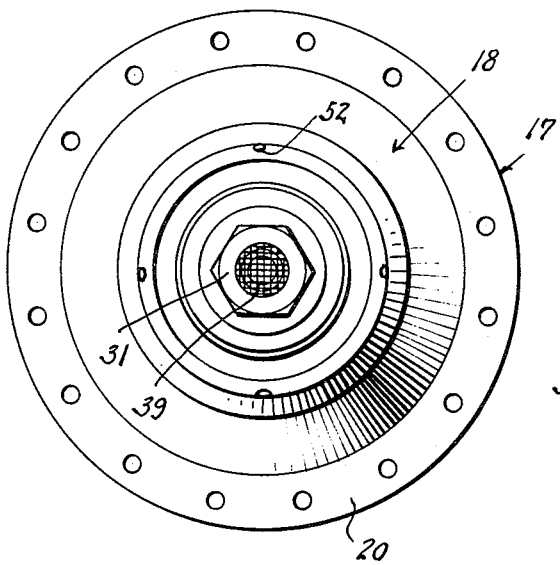
Figure 4 is a bottom plan view of the diaphragm housing with the valve plug.

Referring to the drawings and first to Figures 1 to 5, inclusive, the numeral 10 designates generally a valve housing which is provided with an intake nipple 11 at one end and an outlet nipple 12 at the opposite end. A fluid pressure line 13 is fixed within the intake nipple 11 being soldered or otherwise firmly secured in nipple 11. An outlet pipe 14 is fixedly secured in nipple 12 as by soldering, a pressure fit or the like. The housing 10 includes a bonnet or upwardly projecting nipple 15 having exterior threads 16. A diaphragm housing generally indicated at 17 is threaded onto the threads 16 of bonnet 15, and housing 17 is formed of a lower housing member 18 and an upper housing member 19. The two housing members 18 and 19 are formed at their outer edges with confronting marginal flanges 20 and 21 respectively which are secured together by fastening means 22. The lower diaphragm housing member 18 is formed with a flange 23 which is internally threaded and which is threaded onto the external threads 16. The lower housing member 18 also includes the horizontal wall 24 having a centrally disposed guide 25 which is formed with a central valve stem guiding bore 26. The guide 25 has secured in the lower end thereof a cylindrical valve seat member 27 which may be braced or otherwise firmly secured in the lower end of the guide 25. A valve plug generally indicated at 28 is mounted within the housing 10 and is formed of a cup-shaped member 29 within which a gasket 30 is secured by means of a nut 31. The cup-shaped member 29 is carried by a valve stem 32 and the stem 32 adjacent the cup-shaped member 29 is formed with an enlargement 35 which produces a shoulder 34. A ring-shaped sealing gasket 35 is disposed about the stem 32 and is seated on the shoulder 34 so that when the valve plug 28 is in its upper position gasket 35 will bear against the lower end of valve seat member 27. The enlargement 34 is formed with nut faces 36 and the lower end of the stem 32 is formed with a reduced threaded stud 37 on which the nut 31 is mounted. The stem 32 is provided with a bore 38 extending therethrough and the nut 31 has a screen 39 covering the lower end of the bore 38.

A flexible diaphragm 40 is disposed between the flanges 20 and 21 and divides the interior of the housing 19 into an upper diaphragm chamber 41 and a lower diaphragm chamber 42. The diaphragm 40 is disposed about a reduced stud 43 extending from the upper end of stem 32 and the stud 43 forms a shoulder 44 against which a washer or plate 45 engages. The plate 45 engages the lower side of diaphragm 40 and a nut 46 threaded on the stud 43 integral with pressure plate 45 which bears against the upper side of diaphragm 40. The center of the upper housing 19 has a fluid pressure line 48 connected therewith for discharging fluid under pressure in upper chamber 41. The pipe 48 is adapted to be extended to a point remote from the valve assembly and a manually operable gate valve 49 is interposed in pipe 48. The valve housing 10 is provided with a horizontal wall 50 which is formed on the upper side thereof with a valve seat and the gasket 30 is adapted to engage when the valve is in closed position on seat 51. The lower diaphragm housing member 18 is provided with a plurality of vent openings 52 which communicate chamber 42 with the atmosphere.

The loose connection between the valve stem 32 and the bore 26 of bushing 25 provides for the escape of a small quantity of fluid from the interior of bonnet 15 into lower chamber 42. At the time the valve plug 28 is raised upwardly to an open position air is drawn into chamber 42 and as some foreign particles may also be drawn in with the air, the controlled leakage of fluid from the stem 32 will provide for the draining of the foreign particles from lower chamber 42.

Figure 6:
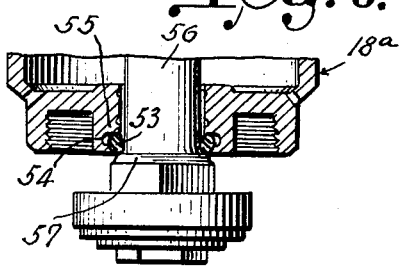
Figure 6 is a fragmentary vertical section of a modified form of stem sealing means.

Referring now to Figure 6 there is disclosed a modified form of this invention wherein the lower diaphragm housing member 18ª is provided with a resilient stem sealing gasket 53 which is disposed in an annular groove formed in the stem guide 55. In this form of the invention the stem 56 is formed with an annular rib 57 adapted to engage the sealing member or gasket 53. The rib 57 is rounded in transverse section so as to provide a surface seating means engageable with the gasket 53. In other respects the structure shown in Figure 6 is similar to that shown in Figures 1 to 5 inclusive.

Figure 7:
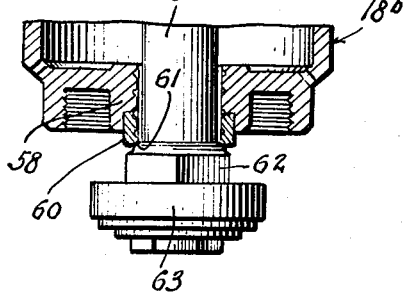
Figure 7 is a fragmentary vertical section of another modified form of stem sealing means.

Referring now to Figure 7, there is disclosed another modification of this invention wherein the lower diaphragm housing member 18ᵇ is provided with a stem guide 58 through which the stem 59 slidably engages.

A cylindrical insert 60 is pressed or otherwise firmly secured in the lower end of the guide 58 and the insert 60 is formed at its lower end with a valve seat 61. The stem 59 is formed with a rounded rib which is engageable against the seat 61 thereby providing a metal sealing means for the stem 59 when the valve plug 63 is in an open position.

In the use and operation of this invention the housing 10 is connected to the pressure line 13 and the exhaust or discharge line 14. The top of the diaphragm housing 17 is connected to the fluid pressure line 48 which has a gate valve 49 interposed therein. When it is desired to move valve plug 28 to an open position valve 49 is opened, thereby exhausting fluid under pressure from upper chamber 41. A plug 64 is threaded into the upper end of valve stem 32 and is provided with a central bore 65 which communicates the pressure from chamber 41 through bore 38 to the intake side of wall 50. At this time the pressure passing through intake nipple 11 into housing 10 will push valve plug 28 upwardly to an open position. As plug 28 moves upwardly to an open position a slight leakage of fluid will occur about the valve stem 32 and the leaking fluid will enter lower diaphragm chamber 42. As diaphragm 40 rises a suction will be created in lower chamber 42 drawing air inwardly through vents 52. The pressure on the lower side of valve plug 28 will hold this plug in an open position so long as valve 49 is also in an open position. The valve plug 28 is moved to a closed position by closing gate valve 49. Closing of gate valve 49 will communicate pressure fluid coming from housing 10 through bore 38 to the upper chamber 41 and this pressure on the upper side of diaphragm 40 will lower valve plug 28 to a closed position.

With a valve construction as hereinbefore described, the valve stem is lubricated by the liquid passing through the valve assembly and the valve plug may be moved to an open or closed position by opening or closing a remotely disposed gate valve connected with the diaphragm housing.

Figure 8:
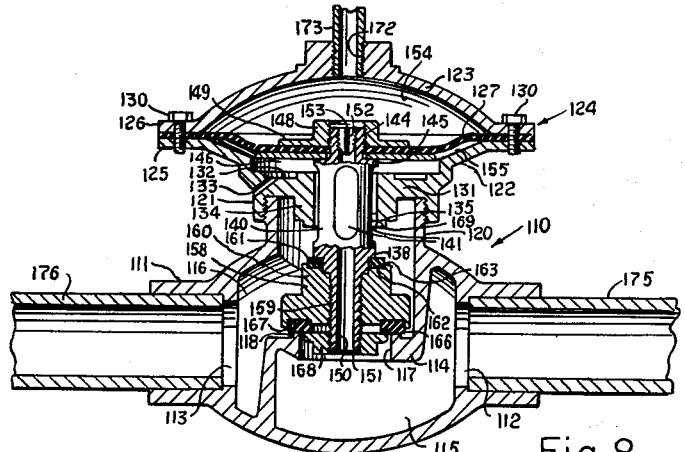
Figure 8 is a vertical sectional view of a modified form of valve embodying the invention showing the valve in closed position.
Figure 9:
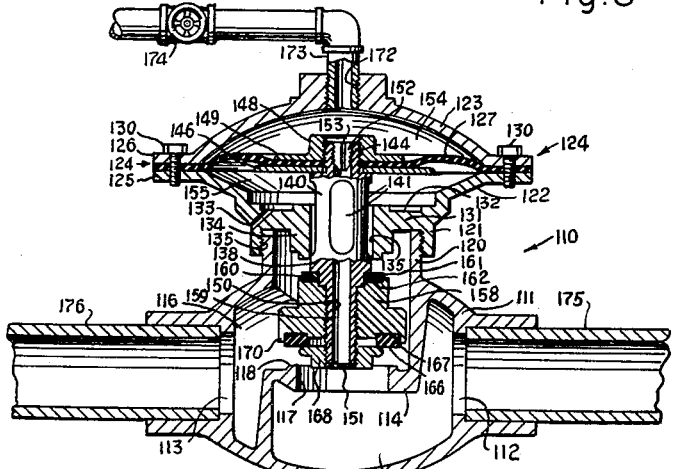
Figure 9 is a view similar to Figure 8 showing the valve in partly open position.
Figure 10:
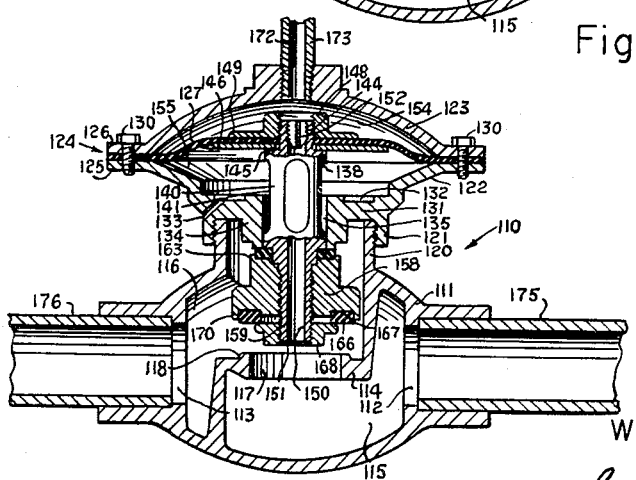
Figure 10 is a view similar to Figure 8 showing the valve in fully open position.

Referring now to Figures 8, 9 and 10 of the drawings, the modified form of the valve 110 includes a valve body 111 which has an inlet 112 and an outlet 113 and which is divided by an internal partition 114 into an inlet chamber 115 and outlet chamber 116. The partition 114 is provided with a vertical bore or passage 117 and has an annular upwardly extending flange 118 forming a valve seat. The valve body also includes an upwardly projecting cylindrical nipple or bonnet 120 externally threaded to receive the dependent internally threaded tubular extension 121 on the lower housing section 122 which with an upper housing section 123 comprises an operator housing 124. The lower housing section has a peripheral annular flat flange 125 which corresponds in size and configuration with a similar annular peripheral flange 126 of the upper housing section, and these flanges abut opposite sides of an annular peripheral edge portion of a diaphragm 127 disposed in the housing. Bolts 130 are threaded in registering threaded holes in the flanges 125 and 126 to secure the two housing sections to one another. The diaphragm, being resilient, is compressed between the flanges and serves as a sealing means to prevent fluid flow between the diaphragm and the housing flanges on either side thereof.

The lower housing section has a horizontal wall 131, disposed inwardly of the tubular extension 121, which is provided with an annular groove 132 in its upper surface and a plurality of vents 133 which communicate with the groove adjacent the outer portion thereof and extend angularly outwardly and downwardly therefrom and open to the atmosphere externally of the tubular extension. The horizontal wall also has a centrally disposed tubular dependent guide member 134 having a valve stem receiving and guiding bore 135.

The valve stem 138 extends slidably through the bore 135 and is of such diameter that its cylindrical surface 140 engages the cylindrical wall of the bore which thus prevents undue lateral movement thereof while permitting vertical movement in the bore. The stem is provided with a plurality of vertical longitudinal flats 141 which are spaced from the wall of the bore 135 and so provide flow passages between the valve stem and the guide member for a purpose to be described below.

The upper end portion 144 of the valve stem is reduced to provide an upwardly facing annular shoulder 145 on which is supported an annular diaphragm support or washer 146. The threaded reduced upper end portion 144 extends through registering apertures in the diaphragm support and the diaphragm into a threaded nut 148 integral with a pressure plate 149 which bears against the upper surface of the diaphragm. It will thus be seen that the valve stem is connected to the diaphragm by means of the nut and the diaphragm support 146 whereby the valve stem will move upwardly and downwardly with the diaphragm.

The valve stem has a longitudinal bore or passage 150 at the lower end of which is provided a screen 151 secured in any suitable way, as by solder, to the lower end of the valve stem. A plug 152 is threaded into the upper end of the bore of the valve stem and has a longitudinal bore 153 whereby fluid may flow therethrough into the upper chamber 154 of the housing defined by the upper housing section and the diaphragm. The diaphragm and the lower housing section define a lower chamber 155.

A valve member 158 is threaded on the reduced lower end portion 159 of the valve stem, and an upper resilient seal ring 160 is disposed between a downwardly facing annular shoulder 161 on the valve stem and the upper end surface 162 of the valve member. The valve member 158 has an annular upwardly extending flange 163 which engages the outer surface of the seal ring to prevent undesired outward distortion or displacement thereof. The seal ring 160 is adapted to engage the valve seat formed by the reduced lower end 169 of the tubular guide member 134 to prevent flow of fluid from the outlet chamber 116 of the valve body into the lower chamber 155 of the housing when the valve stem is raised to its uppermost open position.

The valve member 158 is also provided with a lower resilient seal ring or member 166 disposed in a downwardly opening groove 167 formed in the bottom of the valve member, and the seal ring is held in place by a lock nut 168 threaded on the lower reduced end portion 159 of the valve stem. The downwardly extending outer annular flange 170 of the valve member 158 engages the outer surface of the lower seal ring 166 to prevent lateral distortion or dislocation thereof. The lower seal ring is adapted to engage or seat on the valve seat 118 to close the passage 117 through the partition 114 when the valve stem is in its lowermost position.

The domed upper housing section 123 is provided with a threaded bore 172 by means of which a conduit or pipe 173 may be connected to the housing to communicate with the upper chamber 154. The conduit 173 is provided with a valve 174 by means of which the valve may be operated from a position remote from the valve.

In use, as in a water sprinkling system, the inlet 112 is connected to a source of water under pressure by means of conduit 175 and the outlet 113 is connected by a conduit 176 to a number of sprinkler heads (not shown) to be controlled by the valve 110. Assuming that the control valve 174, which may be either power or manually operated, is closed, the valve stem is in the lower position shown in Figure 1, with the lower seal ring 166 seated on the valve seat 118 and closing the passage 117 of the valve body partition 114. The upper chamber 154 of the housing 123 is filled with water which has flowed thereinto from the inlet chamber 115 of the valve body through the bore 150 of the valve stem. The valve stem is held in this closed lower position by the pressure of the water in the upper chamber, since the area of the diaphragm exposed to the water pressure tending to move the valve stem downwardly is greater than the area of the valve member exposed through the passage 117 to the pressure of the water in the inlet chamber 115 which tends to move it upwardly. Thus it will be apparent that, due to the provision of the bore or passage 150 in the valve stem, the pressure of the fluid whose flow is controlled by the valve is effective to keep the valve closed and prevent flow thereof from the inlet chamber 115 to the outlet chamber 116 and therefore from the conduit 175 to the conduit 176.

The lower chamber 155 of the housing is now in communication with the outlet chamber, since the upper seal ring 160 of the valve member is now spaced below the valve seat 166 of the guide member 134.

If it is desired to open the valve to permit water to flow from the conduit 175 to the conduit 176, the control valve 174 is opened. Opening of the valve 174 relieves the pressure in the upper chamber 154, since the fluid therein can now flow freely therefrom through the conduit 173 and valve 174 whose effective orifice is much larger than the bore 153 of the plug 152. As a result, the pressure of the water acting upwardly on the valve member 158 raises the valve stem upwardly off the valve seat 118 of the partition and water flows through the passage 117 in the valve body partition 114 from the inlet chamber 115 to the outlet chamber 116, and thence to the conduit 176. During such upward movement of the valve stem, before it reaches its uppermost position shown in Figure 3 where the seal ring 160 engages the valve seat 165, water from the outlet chamber flows also upwardly through the bore 135 of the guide member 134 through the passages provided by the flats 140 of the valve stem into lower chamber 155 and thence outwardly of the housing through the plurality of vents 133. The pressure of the water in the lower chamber acts on the diaphragm to assist in raising the valve stem effecting a very quick and positive opening of the valve. Since the vents open downwardly from the debris collecting groove 132, the water flowing therethrough prevents entrance of debris into the lower chamber and also transports any dirt or other debris therein outwardly of the housing through the vents, the velocity and volume of the water flowing into the lower chamber 155 being relatively great because the chamber 155 is in communication with the conduit 175, as shown clearly in Figure 9, during the upward movement of the valve stem to its upper position shown in Figure 10.

When the valve stem reaches its upper position, the seal ring 160 engages the valve seat 169 and seals between the valve stem and the guide member 135, preventing further flow of water from the outlet chamber into the lower chamber. As a result, all of the water entering into the valve body from the conduit 175 now passes therethrough into the conduit 176 and thence to the sprinkler head. The valve stem of course is maintained in the upper position by the pressure of the fluid flowing through the valve. The small volume of fluid flowing into the upper chamber 154 through the restricted passages 153 of the plug 152 is free to flow out of the chamber through the conduit 173, so no appreciable pressure exists in the upper chamber.

When it is desired to stop the flow of water through the valve 110, the control valve 174 is closed. As a result the water flowing upwardly into the upper chamber 154 through the bore 150 of the valve stem is prevented from leaving the chamber, and the fluid pressure builds up in the upper chamber. As a consequence, the increased pressure in the upper chamber acting on the diaphragm causes the valve stem to be moved back downwardly to its original position shown in Figure 3, wherein the seal ring 166 closes the passage 117 of the partition 114.

During such downward movement of the valve stem, water again flows upwardly through the bore 135 of the guide member 134 through the passages provided by the flats 140 of the valve stem into the lower chamber 155 and thence outwardly through the vents 133 so that during such closing movement of the valve stem water again flows outwardly through the vents preventing entrance of debris into the lower chamber. The vents 133 permit outward flow of water from the lower chamber 155 so that no water is trapped or caught below the diaphragm to prevent such downwardly movement of the diaphragm and the valve stem. They also permit drainage of the conduit 176 downstream of the valve 110 to prevent breakage by freezing.

When it is desired to inspect, repair or replace any of the operating parts of the valve 110, the operator housing is merely unscrewed from the bonnet 120 of the valve body, whereupon the housing and the valve stem are removed from the valve body and may be taken to a repair area where the housing and valve stem assembly may be disassembled and any repairs or replacements of components thereof effected. The valve body itself is not disconnected from the conduits 175 and 176, being left in place. This permits the conduits 175 and 176 to be secured to the valve body by solder or other permanent connection, instead of by threaded connections so the valve body need seldom or never be removed from the fluid flow line of which it constitutes a part when connected between the conduits 175 and 176. When the housing and valve stem assembly has been inspected or repaired, it is very easily connected or reassembled to the valve body by screwing the housing back on the bonnet 134 of the valve body.

It will thus be seen that a new and improved valve 110 has been illustrated and described which includes a valve body 111 having a partition 114 whose passage 117 is adapted to be closed by a valve member 156 mounted on a valve stem 138 actuated by a diaphragm 127 in an operator housing 123. It will also be seen that the diaphragm divides the operator housing into lower and upper chambers 154 and 155, respectively, and that the valve stem carried thereby is provided with a bore 150 restricted by a plug 152 whereby the pressure of the fluid whose flow is controlled by the valve is communicated to the upper chamber of the housing to cause the diaphragm and the valve to move downwardly and close the passage 117 to prevent fluid flow through the valve body when the opening 172 of the upper housing section 123 is effectively closed by a control valve 174.

It will also be apparent that the lower housing section 122 is provided with a plurality of downwardly and outwardly directed vents which communicate with the bottom of a debris collecting groove 132 in such housing section whereby debris entering the lower chamber 155 tends to accumulate in the groove and does not accumulate around the valve stem or in the bore 135 of the guide member 134 where it might obstruct movement of the valve stem or cause undue wear of operative parts.

It will also be seen that the valve stem is provided with longitudinal flats to provide passages between the guide member 134 and the valve stem during vertical movements of the valve stem whereby the flow of water into the lower chamber from the outlet chamber 116 is effective to transport or wash out through the vents the debris accumulated in the groove 132.

It will also be apparent that the housing and valve stem may be assembled on and disassembled from the valve body 111 as a complete unit merely by unscrewing the tubular extension 121 of the lower housing section from the bonnet 120 of the valve body.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A valve comprising: a valve body; a partition separating the valve body into inlet and outlet chambers and having a passage affording communication between the inlet and outlet chambers; a valve member movable between an upper position remote from said partition and said inlet chamber and a lower position adjacent said partition and said inlet chamber, said valve member closing said passage when in said lower position; an operator housing having a diaphragm providing upper and lower chambers; and a hollow valve stem connecting said diaphragm and said valve member and extending through said lower chamber of said housing and said outlet chamber to said inlet chamber when said valve member is in its lower position, said housing having vent means communicating with said lower chamber, said valve stem and said housing providing means for flow of fluid from the outlet chamber into the lower chamber during movement of said valve member between said upper and lower positions, said housing having vent means communicating with said upper chamber which may be selectively opened and closed to thereby relieve and build up pressure in said upper chamber.

2. A valve comprising: a valve body; a partition separating the valve body into inlet and outlet chambers and having a passage affording communication between the inlet and outlet chambers; a valve member movable between an upper position remote from said partition and said inlet chamber and a lower position adjacent said partition and said inlet chamber, said valve member closing said passage when in said lower position; a housing having a diaphragm providing upper and lower chambers; and a hollow valve stem connecting said diaphragm and said valve member and extending through said lower chamber of said housing and said outlet chamber of said valve body to said inlet chamber when said valve body is in its lower position, said housing having a vent communicating with said lower chamber, said valve stem and said housing providing means for flow of fluid from the outlet chamber into the lower chamber during movement of said valve member between said upper and lower positions, said valve member having sealing means engageable with said housing for sealing off the lower chamber when the valve member is in said upper position, said housing having a vent means communicating with said upper chamber which may be selectively opened and closed to thereby relieve and build up pressure.

3. A valve comprising: a valve body; a partition separating the valve body into inlet and outlet chambers and having a passage affording communication between the inlet and outlet chambers; a valve member movable between an upper position wherein said valve member is remote from said partition and said inlet chamber and a lower position wherein said valve member is adjacent said partition and said inlet chamber, said valve member closing said passage when in said lower position; a housing having a diaphragm providing upper and lower chambers; and a hollow valve stem connecting said diaphragm and said valve member and extending through said lower chamber of said housing and said outlet chamber of said valve body to said inlet chamber when said valve member is in said lower position, said housing having a vent communicating with said lower chamber, said valve stem and said housing providing means for flow of fluid from the outlet chamber into the lower chamber during movement of said valve member between said upper ond lower positions, said housing having means for selectively relieving pressure in said upper chamber.

4. A valve comprising: a valve body; a partition separating the valve body into inlet and outlet chambers and having a passage affording communication between the inlet and outlet chambers; a valve member movable between an upper position remote from said partition and said inlet chamber and a lower position adjacent said partition and said inlet chamber, said valve member closing said passage when in said lower position; a housing having a diaphragm providing upper and lower chambers; and a hollow valve stem connecting said diaphragm and said valve member and extending through said lower chamber of said housing and said outlet chamber of said valve body to said inlet chamber when said valve body is in said lower position, said housing having a vent communicating with said lower chamber, said valve stem and said housing providing means for flow of fluid from the outlet chamber into the lower chamber during movement of said valve member between said upper and lower positions, said valve member having sealing means engageable with said housing for sealing off the lower chamber when the valve member is in said upper position, said housing having means for selectively relieving pressure in said upper chamber.

5. A valve comprising: a valve body; a partition separating the valve body into inlet and outlet chambers and having a passage affording communication between the inlet and outlet chambers; a valve member movable between an upper position remote from said partition and said inlet chamber and a lower position adjacent said partition and said inlet chamber, said valve member closing said passage when in said lower position; an operator housing having a diaphragm providing upper and lower chambers; and a hollow valve stem connecting said diaphragm and said valve member and extending through said lower chamber of said housing and said outlet chamber of said valve body to said inlet chamber when said valve body is in said lower position, said housing having vent means communicating with said lower chamber, said valve stem and said housing providing means for flow of fluid from the outlet chamber into the lower chamber during movement of said valve member between said upper and lower positions, said housing having a debris collecting area in said lower chamber, said vent means extending downwardly and outwardly from said debris collecting area, said housing having means for selectively relieving pressure in said upper chamber.

6. A valve comprising: a valve body; a partition separating the valve body into inlet and outlet chambers having a passage affording communication between the inlet and outlet chambers; and a housing and valve stem assembly removably connected to said valve body, said housing having a diaphragm providing upper and lower chambers in said housing, said valve stem being carried by said diaphragm and movable thereby between an upper position wherein said valve stem is remote from said partition and said inlet chamber and a lower position wherein said valve stem is adjacent said partition and said inlet chamber, said valve stem having means for closing said passage when in a lower position, said valve stem being hollow, said housing and said valve stem providing means for flow of fluid from the outlet chamber into the lower chamber when said valve stem is moved upwardly from its lower position, said housing having vent means communicating with said lower chamber, said housing having means for selectively relieving pressure in said upper chamber.

7. A valve comprising: a valve body; a partition separating the valve body into inlet and outlet chambers and having a passage affording communication between the inlet and outlet chambers; and a housing and valve stem assembly removably connected to said valve body, said housing having a diaphragm providing upper and lower chambers in said housing, said valve stem being carried by said diaphragm and movable thereby between an upper position wherein said valve stem is remote from said partition and said inlet chamber and a lower position wherein said valve stem is adjacent said partition and said inlet chamber, said valve stem having means for closing said passage when in a lower position, said valve stem being hollow, said housing and said valve stem providing means for flow of fluid from the outlet chamber into the lower chamber when said valve stem is moved upwardly from its lower position, said housing having vent means communicating with said lower chamber, said valve stem also having means for sealing between the outlet chamber and the lower chamber when said valve stem is moved to said upper position, said housing having means for selectively relieving pressure in said upper chamber.

8. A valve comprising: a valve body; a partition separating the valve body into inlet and outlet chambers and having a passage affording communication between the inlet and outlet chambers, said body having an upwardly extending bonnet; an operator housing having an upper section having port means, a lower section having a horizontal wall and a tubular extension removably connected to said bonnet, and a diaphragm disposed between the upper and lower sections and dividing the housing into an upper chamber and a lower chamber, said horizontal wall being provided with a tubular valve stem guide; and a hollow valve stem carried by said diaphragm and movable between an upper position wherein said valve stem is remote from said partition and said inlet chamber and a lower position wherein said valve stem is adjacent said partition and said inlet chamber, said valve stem having means for closing said passage when in a lower position and for engaging the lower end of the tubular guide for sealing between the tubular guide and the valve stem when in an upper position, said valve guide and valve stem providing communication between said outlet chamber and said lower chamber when said valve stem is in said lower position and also when it is between said upper and lower positions, said lower housing section having vent means communicating with said lower chamber, said housing having vent means for selectively relieving pressure in said upper chamber.

9. A valve comprising: valve body; a partition separating the valve body into inlet and outlet chambers and having a passage affording communication between the inlet and outlet chambers, said body having an upwardly extending bonnet; an operator housing having an upper section having port means, a lower section having a horizontal wall and a tubular extension removably connected to said bonnet, and a diaphragm disposed between the upper and lower sections and dividing the housing into an upper chamber and a lower chamber, said horizontal wall being provided with a tubular valve stem guide; and a hollow valve stem carried by said diaphragm and thereby movable between an upper position wherein said valve stem is remote from said partition and said inlet chamber and a lower position wherein said valve stem is adjacent said partition and said inlet chamber, said valve stem having means for closing said passage when in a lower position and for engaging the lower end of the tubular guide for sealing between the tubular guide and the valve stem when in an upper position, said valve guide and valve stem providing communication between said outlet chamber and said lower chamber when said valve stem is between said upper and lower positions, said lower housing section having vent means communicating with said lower chamber, said horizontal wall having a groove surrounding said valve guide, said vents extending downwardly from said groove, said housing having vent means for selectively relieving pressure in said upper chamber.

10. A valve comprising: a valve body; a partition separating the valve body into inlet and outlet chambers and having a passage affording communication between the inlet and outlet chambers, said body having an upwardly extending bonnet; an operator housing having an upper section having control port means, a lower section having a horizontal wall and a tubular extension removably connected to said bonnet, and a diaphragm disposed between the upper and lower sections and dividing the housing into an upper chamber and a lower chamber, said horizontal wall being provided with a tubular valve stem guide; and a hollow valve stem carried by said diaphragm and movable thereby between an upper position wherein said valve stem is remote from said partition and said inlet chamber and a lower position wherein said valve stem is adjacent said partition and said inlet chamber, said valve stem having means for closing said passage when in a lower position and for engaging the lower end of the tubular guide for sealing between the tubular guide and the valve stem when in an upper position, said valve stem being cylindrical and having vertical flats to provide communication between said outlet chamber and said lower chamber when said valve stem is between said upper and lower positions, said lower housing section having vent means communicating with said lower chamber, said housing having vent means for selectively relieving pressure in said upper chamber.

11. A valve comprising: a valve body; a partition separating the valve body into inlet and outlet chambers and having a passage affording communication between the inlet and outlet chambers, said body having an upwardly extending bonnet; an operator housing having an upper section having control port means, a lower section having a horizontal wall and a tubular extension removably connected to said bonnet, and a diaphragm disposed between the upper and lower sections and dividing the housing into an upper chamber and a lower chamber, said horizontal wall being provided with a tubular valve stem guide; and a hollow valve stem carried by said diaphragm and movable thereby between an upper position wherein said valve stem is remote from said partition and said inlet chamber and a lower position wherein said valve stem is adjacent said partition and said inlet chamber, said valve stem having means for closing said passage when in a lower position and for engaging the lower end of the tubular guide for sealing between the tubular guide and the valve stem when in an upper position, said valve stem being cylindrical and having vertical flats to provide communication between said outlet chamber and said lower chamber when said valve stem is between said upper and lower positions, said lower housing section having vent means communicating with said lower chamber, said horizontal wall having a groove surrounding said valve guide, said vents extending downwardly from said groove, said housing having vent means for selectively relieving pressure in said upper chamber.

12. A valve comprising: a valve body; a partition separating the valve body into inlet and outlet chambers and having a passage affording communication between the inlet and outlet chambers; a valve member movable between an upper position wherein said valve member is removed from said partition and said inlet chamber and a lower position wherein said valve member is adjacent said partition and said inlet chamber, said valve member closing said passage when in said lower position; an operator housing having a diaphragm providing upper and lower chambers; and a hollow valve stem connecting said diaphragm and said valve member and extending through said lower chamber into said outlet chamber, said housing having vent means communicating with said lower chamber, said valve stem and said housing providing means for flow of fluid from the outlet chamber into the lower chamber during movement of said valve member between said upper and lower positions, said hollow valve stem having a longitudinal passage of smaller cross-sectional area than the passage of said partition, said housing having vent means for selectively relieving pressure in said upper chamber.

References Cited in the file of this patent

UNITED STATES PATENTS

| | | |
|---|---|---|
| 2,573,369 | Snoddy | Oct. 30, 1951 |
| 2,772,066 | Keeton | Nov. 27, 1956 |
| 2,833,304 | Fish | May 6, 1958 |